(12) United States Patent
Chen et al.

(10) Patent No.: US 7,480,148 B2
(45) Date of Patent: Jan. 20, 2009

(54) COMPUTER ENCLOSURE

(75) Inventors: Yun-Lung Chen, Tu-Cheng (TW); Jun Tang, Shenzhen (CN); Shao-Bin Zhang, Shenzhen (CN); Zhou Xu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 523 days.

(21) Appl. No.: 11/193,907

(22) Filed: Jul. 29, 2005

(65) Prior Publication Data

US 2006/0139864 A1 Jun. 29, 2006

(30) Foreign Application Priority Data

Dec. 24, 2004 (CN) .................... 2004 2 0103472

(51) Int. Cl.
*G06F 1/16* (2006.01)
(52) U.S. Cl. .................... 361/726; 361/724; 312/223.1; 312/223.2
(58) Field of Classification Search ......... 361/679–686, 361/724–727, 796; 312/223.1, 223.2, 265.5
See application file for complete search history.

(56) References Cited

U.S. PATENT DOCUMENTS

| 5,743,606 A * | 4/1998 | Scholder ................... 312/223.2 |
| 5,785,398 A * | 7/1998 | Park ......................... 312/223.2 |
| 6,654,236 B2 * | 11/2003 | Chen et al. .................. 361/683 |
| 6,935,661 B1 * | 8/2005 | Farnsworth et al. ......... 292/162 |
| 2003/0030972 A1 * | 2/2003 | Laio ........................... 361/681 |
| 2003/0151333 A1 * | 8/2003 | Chen ........................ 312/223.2 |
| 2006/0023427 A1 * | 2/2006 | Strmiska et al. ............ 361/724 |
| 2006/0103272 A1 * | 5/2006 | Chen et al. ................ 312/223.2 |
| 2006/0133023 A1 * | 6/2006 | Chen et al. .................. 361/683 |

FOREIGN PATENT DOCUMENTS

| CN | 02225893.0 | 1/2003 |
| TW | 087213422 | 4/2000 |

\* cited by examiner

*Primary Examiner*—Jayprakash N Gandhi
*Assistant Examiner*—Anthony Q Edwards
(74) *Attorney, Agent, or Firm*—Morris Manning Martin LLP; Tim Tingkang Xia, Esq.

(57) ABSTRACT

A computer enclosure includes a chassis (90), a cover (10) and a resilient member (50). The chassis includes a recess (911) and at least one locking member (70). A cover is mounted on the chassis. The cover has a stop (115) adapted to engage with the locking member for securing the cover on the chassis. The resilient member is attached to the cover and compressed in the recess for forcing the cover to move away from the chassis when the locking member is disengaged from the stop.

18 Claims, 5 Drawing Sheets

COMPUTER ENCLOSURE

BACKGROUND OF THE INVENTION

1. Field of the Invention

The present invention relates to a computer enclosure, more particularly to a computer enclosure with a cover and a chassis attached together.

2. Background of the Invention

With the popularization of computers, our modern society is closely linked to computers. A computer enclosure generally includes a chassis and a cover assembled thereto. It is required that a computer cover should be demounted and mounted conveniently for checking malfunction of hardware and repairing interior components of a computer. A typical mounting assembly usually utilizes a plurality of screws, directly attaching a computer cover to a computer chassis. Thereby, screwdrivers or other detaching tools are necessary for installation or removal of the computer cover in assembly or disassembly processes, which is laborious and time-consuming.

Generally, the cover is assembled to the chassis by screws and which takes time in assembly and disassembly. This also inevitably increases the manufacturing cost. In addition, screws or the equivalents are also parts of inventory which should be carefully monitored in order to prevent a shutdown of the production line. Understandably, some attempts have been taken to introduce the snapping type enclosure by using less or without screws. Therefore, an improved mounting assembly for a cover of a computer enclosure that overcomes the above-mentioned problems is desired.

What is needed, therefore, is a mounting assembly for a cover of a computer enclosure facilitating engagement and disengagement between a cover and a chassis.

SUMMARY

A computer enclosure includes a chassis, a cover and a resilient member. The chassis includes a recess and a locking member. A cover is mounted on the chassis. The cover has a stop adapted to engage with the locking member for securing the cover on the chassis. The resilient member is attached to the cover and compressed in the recess for forcing the cover to move away from the chassis when the locking member is disengaged from the stop.

Other objects, advantages and novel features of the invention will become more apparent from the following detailed description when taken in conjunction with the accompanying drawings, in which:

DETAILED DESCRIPTION OF THE INVENTION

Figure 1:
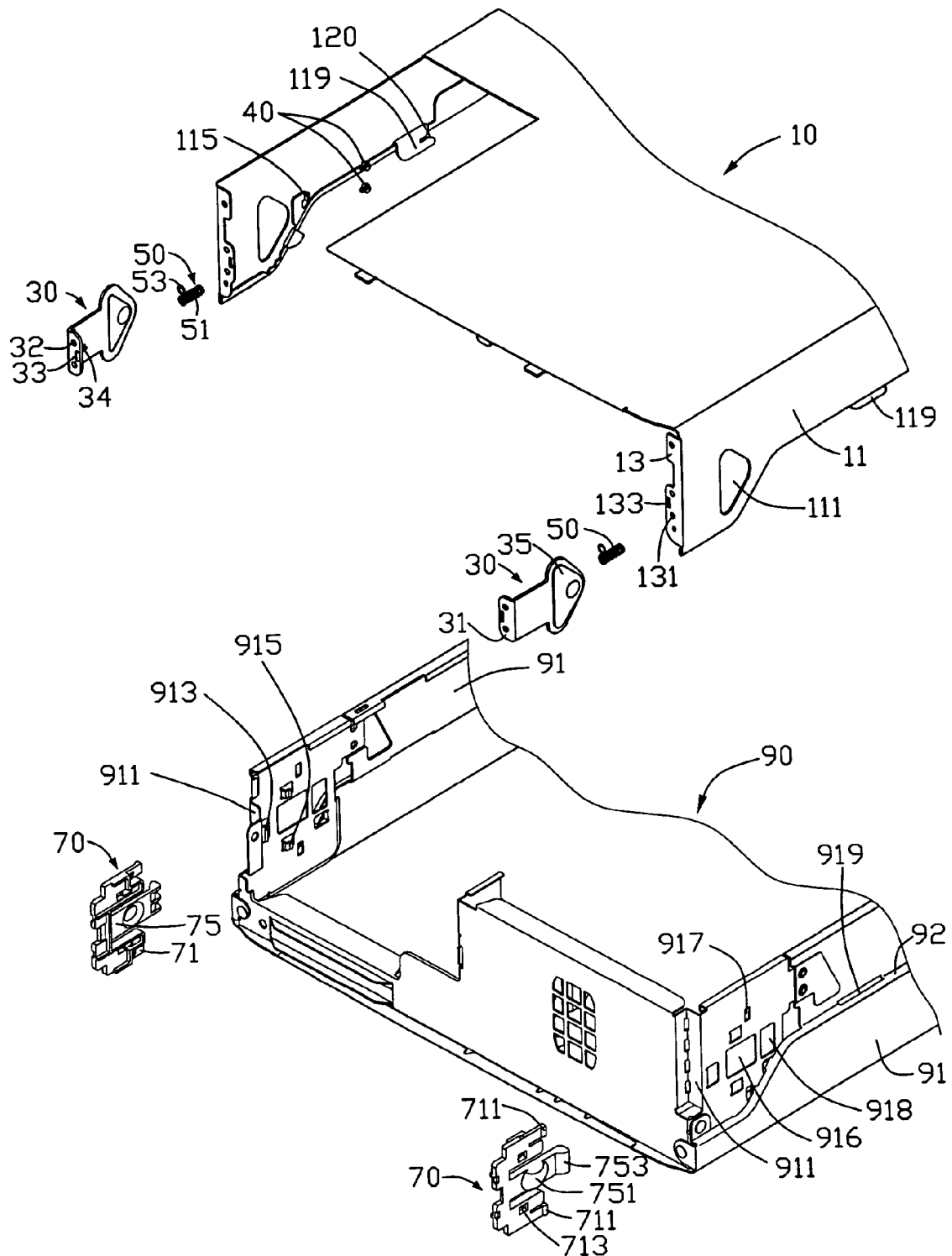
FIG. 1 is an exploded, isometric view of a computer enclosure in accordance with a preferred embodiment of the present invention including a cover, a chassis, a locking member and a resilient member.
Figure 2:
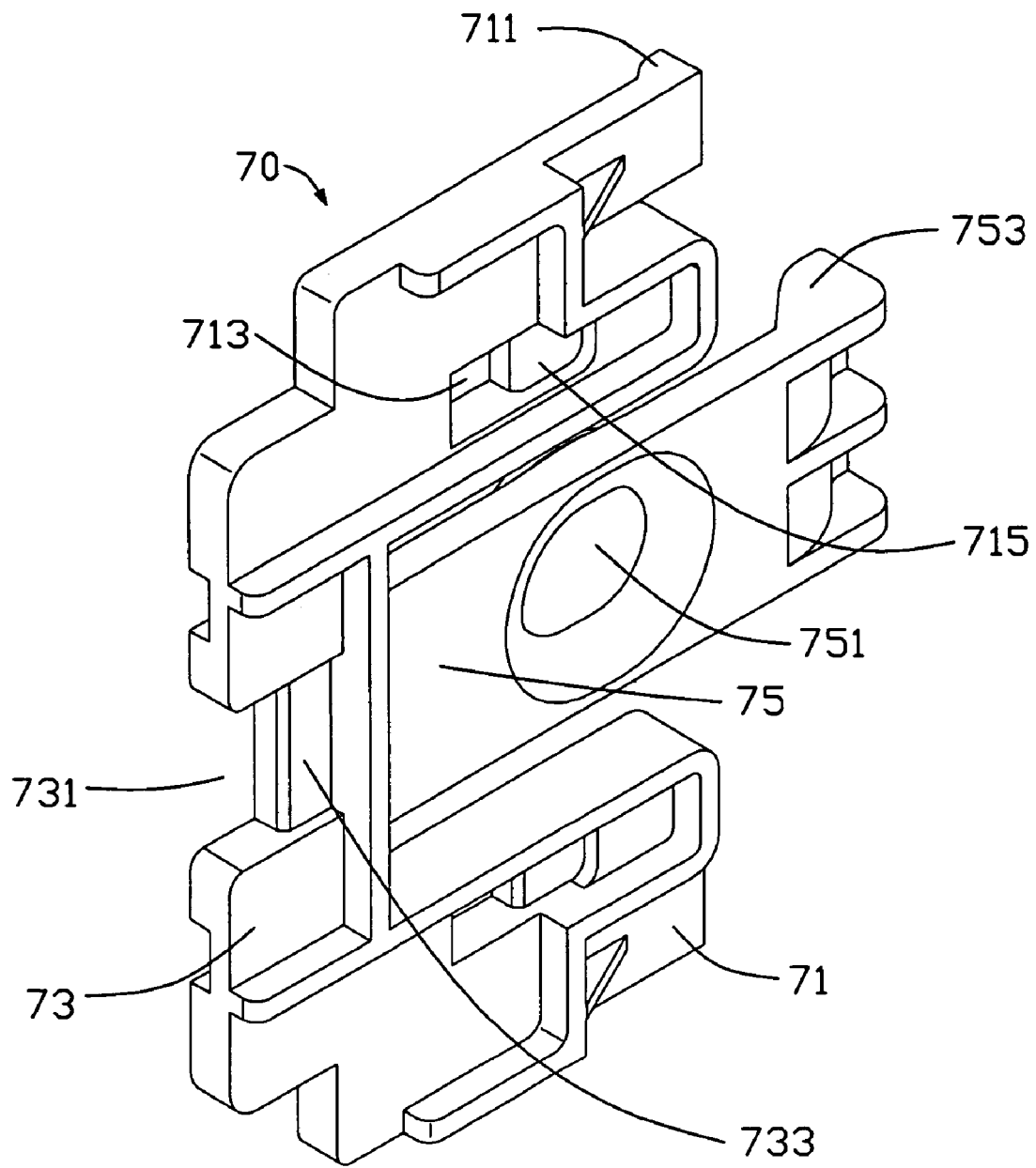
FIG. 2 is an isometric view of the locking member of FIG. 1.

Referring to FIGS. 1 and 2, a computer enclosure includes a cover 10, a pair of pressing members 30, a pair of resilient members 50, a pair of locking members 70 and a chassis 90. The cover 10 is secured to the chassis 90 via the locking member 70, and is removed from the chassis 90 via the pressing member 30 and the resilient member 50.

The cover 10 includes two opposite side panels 11. A distal end of each side panel 11 is bent inwardly and perpendicularly to form a flange 13. A slot 133 and a pair of screw holes 131 are defined in each flange 13. A hole 111 is defined in each side panel 11 near the flange 13. A stop 115 is formed on an inner surface of each side panel 11. Each side panel 11 further includes a plurality of latching pieces 119 each defining a cutout 120.

The pressing member 30 includes a second flange 31 bent vertically from one free end of the pressing member 30 and a button 35 protruding on the other free end. The second flange 31 defines a pair of screw holes 32 corresponding to the screw holes 131 in the cover 10. A tab 33 for engaging in the slot 133 is formed on the second flange 31. The pressing member 30 further includes an upstanding post 34 on an inner side of the second flange 31. The pressing member 30 is fastened to the cover 10 via a pair of screws 40.

The resilient member 50 has a spring 51 and a fixing portion 53 formed outwardly on one end thereof. The post 34 can be enclosed in the spring 51.

The locking member 70 is made of elastic material, i.e. plastics, metals and so on. The locking member 70 includes a pair of wings 71, an elastic finger 75 formed between the two wings 71 and a connecting portion 73 connecting an end of the elastic finger 75 and the pair of wings 71 together. Thus, the other end of the elastic finger 75 is adapted to be bent around the connecting portion 73. Each wing 71 forms a first hook 711 at a free end thereof. A lock aperture 713 is defined in the middle of each wing body, and a clip 715 is formed on one edge of the lock aperture 713. The connecting portion 73 defines a cutout 731 in the middle part of its edge. A strip 733 is formed in the cutout 731. A second hook 753 is formed at the other end of the elastic finger 75. A protrusion 751 extends outward from the elastic finger 75.

The chassis 90 includes two opposite side walls 91 each defining a recess 911 at a front corner thereof. Corresponding to the strip 733 and the clips 715 on the locking member 70, a L-shaped tab 913 and a pair of L-shaped tabs 915 are respectively stamped inwardly from each side wall 91. A first opening 916 for receiving the protrusion 751 of the locking member 70 is defined on side wall 91. A pair of second openings 917 is defined around the first opening 916, corresponding to the first hooks 711 on the wings 71. A third opening 918 is defined adjacent to the first opening 916, corresponding to the second hook 753 of the locking member 70. Each side wall 91 is formed to have a shoulder 92 that defines a plurality of slits 919 corresponding to the latching pieces 119 of the cover 10.

Figure 3:
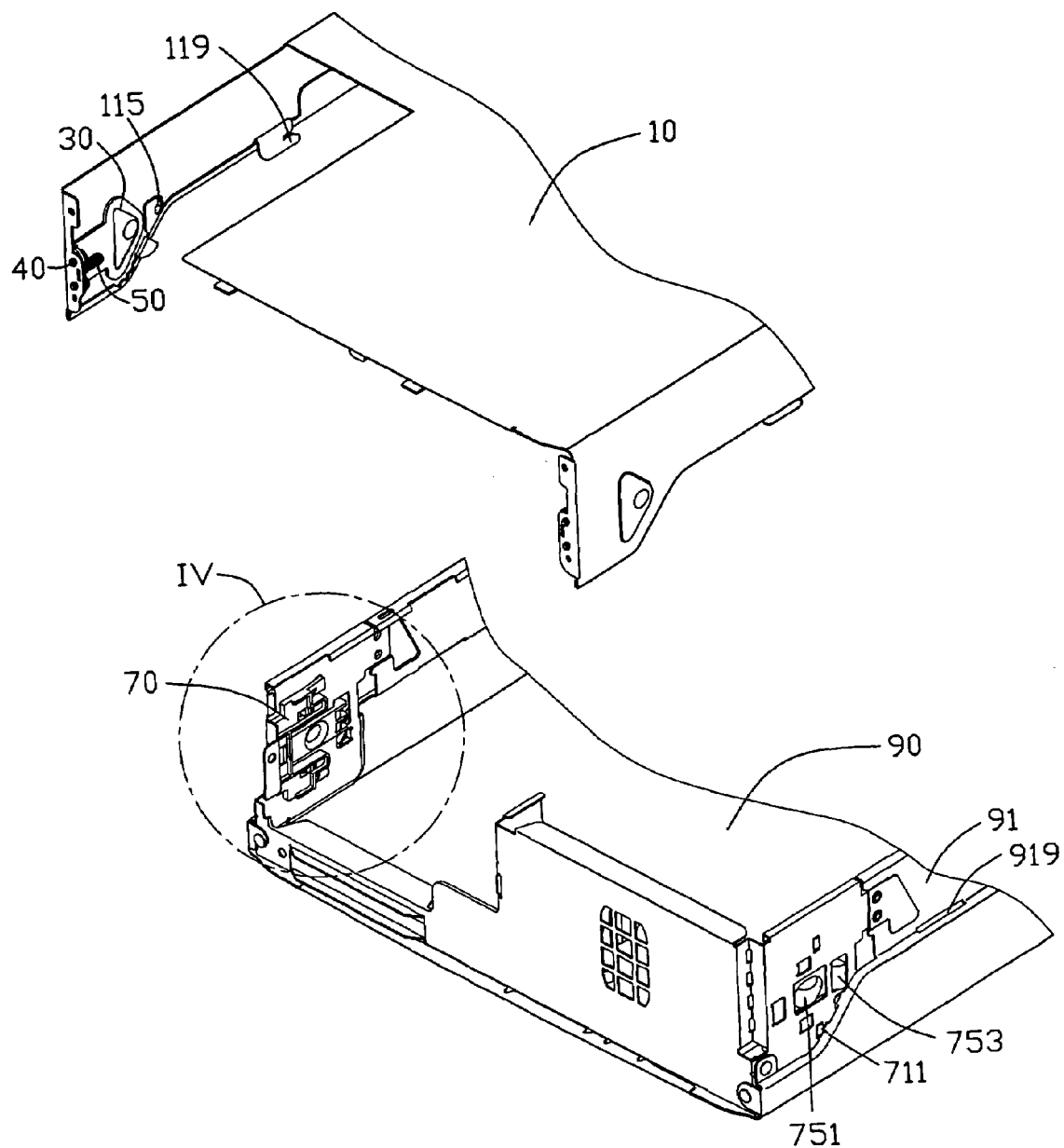
FIG. 3 is an partially assembled view of FIG. 1, showing the resilient member assembled to the cover and the locking member assembled to the chassis.
Figure 4:
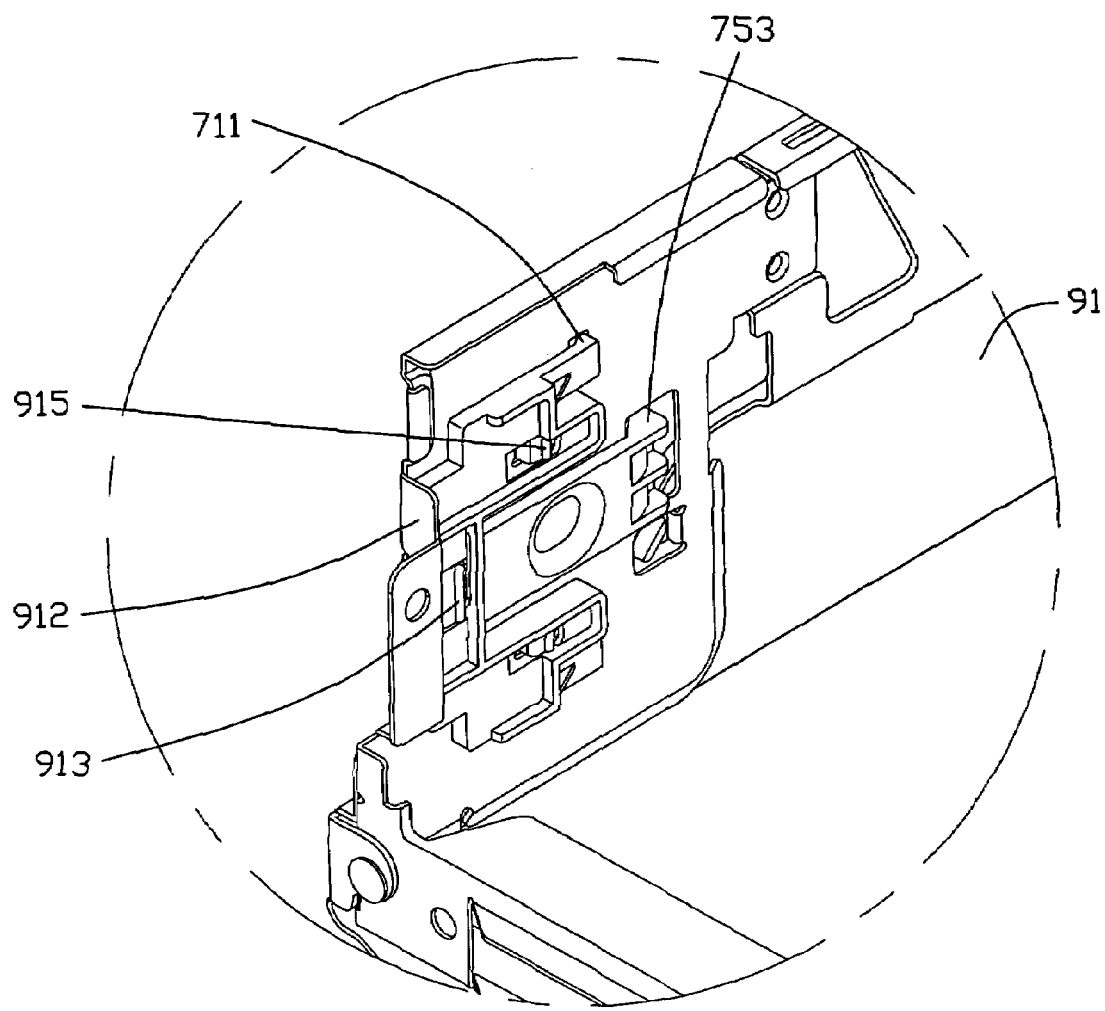
FIG. 4 is an enlarged, isometric view of portion IV in FIG. 3.

Referring to FIGS. 3 and 4, in assembly of the locking member 70, the tab 913 is engaged in the cutout 731, and the tabs 915 are engaged in the lock apertures 713. The tabs 913, 915 catch on the strip 733 and clips 715. The first hooks 711 engage in the second openings 917. The tabs 913, 915 urge the first hooks 711 and the second hook 753 of the locking member 70 to engage into the second openings 917 and the third opening 918 of the chassis 90 respectively, and the second hook 753 is protruded out of an outer side of the side wall 91. So the locking member 70 is secured on the inner side of the side wall 91. At the same time, the protrusion 751 is positioned in the first opening 916 and extends through the first opening 916 to protrude out of the outer side of the side wall 91.

The resilient member 50 is attached to the post 34 with the fixing portion 53 in alignment with one of the screws holes 32 of the pressing member 30. The screws 40 are screwed into the screw holes 131 and the screw holes 32 to secure the pressing member 30 on the inner side of the side panel 11 with the button 35 in alignment with the hole 111 to be able to swing on the side panel 11. Thus, the resilient member 50 is secured with the pressing member 30, and the pressing member 30 is secured to the cover 10.

Figure 5:
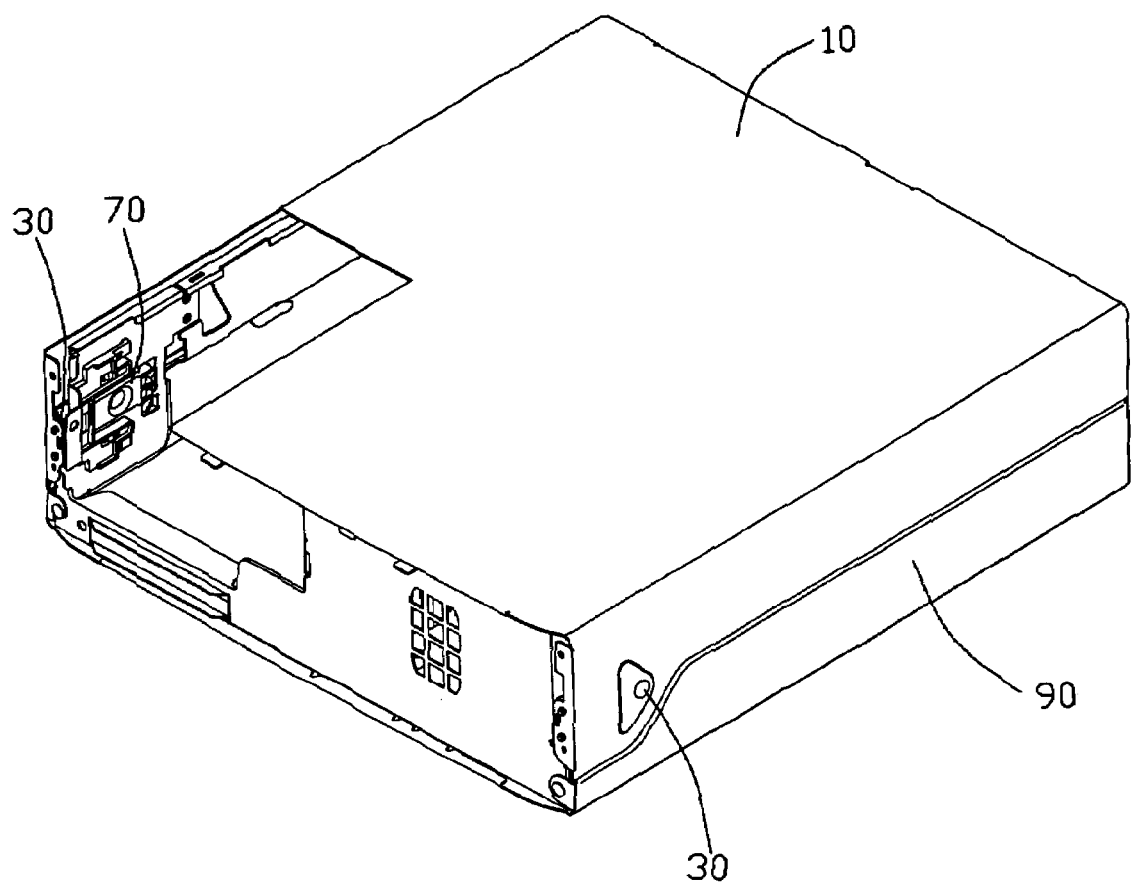
FIG. 5 is an assembled isometric view of FIG. 1.

Referring to FIG. 5, the cover 10 is put on the chassis 90. The latching pieces 119 of the cover 10 are inserted into the slits 919 of the chassis 90. The free end of the resilient member 50 is received in the recess 911 of the chassis 90. Then the cover 10 is pushed horizontally. The latching pieces 119 slide in the slits 919 and the resilient member 50 is compressed against a wall of the recess 911. During the movement, the stop 115 forces the second hook 753 to be inwardly deformed, thereby allowing the stop 115 to pass by. Then the second hook 753 rebounds and engages with the stop 15 to stop the cover 10 to slide backward. At the same time, the cutout 120 of the latching piece 119 snaps at an edge of the slit 919. So the cover 10 is mounted on the chassis 90. The button 35 is in alignment with the protrusion 751.

When disassembling the cover 10, pressure applied to the button 35 pushes the corresponding protrusion 751 inwardly to deform the elastic finger 75 to cause the second hook 753 escaping from the stop 115. The resilient member 50 rebounds and urges the cover 10 to slide reversely on the chassis 90. So the cover 10 can be removed from the chassis 90.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A computer enclosure comprising:
a chassis comprising a side wall, the side wall defining a first opening and a third opening, a locking member secured on an inner side of the side wall, the locking member comprising an elastic finger, the elastic finger comprising a second hook extending through the first opening from the inner side of the side wall to protrude out of an outer side of the side wall, the locking member further comprising an protrusion extending through the first opening from the inner side of the side wall to protrude out of the outer side of the side wall;
a cover adapted to be mounted on the chassis, the cover comprising a side panel facing the outside of the side wall of the chassis, the side panel forming a stop configured to slide over the second hook and bend the elastic finger to engage with the second hook; and
a pressing member mounted on the side panel of the cover with one free end of the pressing member secured on the side panel and the other free end adapted to swing on the side panel, the other free end of the pressing member being aligned with the protrusion configured to push the protrusion to bend the elastic finger to disengage the second hook from the stop.

2. The computer enclosure as described in claim 1, wherein the pressing member is mounted on an inner side of the side panel, the side panel defines a hole in alignment with the other free end of the pressing member to access the other free end of the pressing member.

3. The computer enclosure as described in claim 1, wherein a resilient member is attached to the cover, the resilient member comprising a spring and a fixing portion, the fixing portion is secured on the cover to attach the resilient member on the cover, and the spring is compressed between the cover and the chassis configured to move the cover away from the chassis when the second hook is disengaged from the stop.

4. The computer enclosure as described in claim 1, wherein a plurality of tabs is formed on the chassis for retaining the locking member thereon.

5. The computer enclosure as described in claim 1, wherein the chassis has a plurality of slits, and the cover has a plurality of latching pieces for engaging into the slits.

6. The computer enclosure as described in claim 1, wherein the locking member comprises a pair of wings secured on the side wall, the elastic finger is formed between the pair of wings, the second hook is formed on one end of the elastic finger, and the locking member further comprises a connecting portion connecting the other end of the elastic finger and the two wings together adapted to bend the one end of the elastic finger around the connecting portion.

7. A computer enclosure comprising:
a chassis comprising at least one locking member, the locking member comprising a pair of wings, an elastic finger formed between the pair of wings, and a connecting portion connecting an end of the elastic finger and the two wings together adapted to bend the other end of elastic finger around the connecting portion, the pair of wings firmly secured on the chassis, the other end of the elastic finger forming a second hook thereon;
a cover adapted to be mounted on the chassis, the cover having a stop, the stop configured to slide over the second hook and bend the elastic finger to engage with the second hook for securing the cover on the chassis; and
a resilient member compressed between the chassis and the cover for forcing the cover to move away from the chassis when the second hook is disengaged from the stop.

8. The computer enclosure as described in claim 7, wherein the chassis has a plurality of slits, and the cover has a plurality of latching pieces for engaging into the slits.

9. The computer enclosure as described in claim 7, wherein the resilient member comprising a spring and a fixing portion, the fixing portion is secured on the cover to attach the resilient member on the cover, and the spring is compressed between the cover and the chassis.

10. The computer enclosure as described in claim 7, wherein the chassis comprises a side wall, the side wall defines a third opening, the locking member is secured on an inner side of the side wall with the second hook extending through the first opening from the inner side of the side wall to protrude out of an outer side of the side wall.

11. The computer enclosure as described in claim 10, wherein the cover comprises a side panel facing the outside of the side wall of the chassis, the stop is formed on the side panel.

12. The computer enclosure as described in claim 7, wherein the chassis comprises a side wall, the locking member is secured on an inner side of the side wall, the sidewall defines a first opening, the locking member further comprises a protrusion extending through the first opening from the inner side of the side wall to protrude out of the outer side of the side wall, a pressing member is mounted on the cover with one free end of the pressing member secured on the cover and the other free end adapted to swing on the cover, the other free end of the pressing member is aligned with the protrusion and configured to push the protrusion to bend the elastic finger to disengage the second hook from the stop.

13. The computer enclosure as described in claim 12, wherein the pressing member is mounted on an inner side of the cover, the cover defines a hole in alignment with the other free end of the pressing member to access the other free end of the pressing member.

14. A computer enclosure comprising:
  a chassis comprising a side wall with at least one opening defined, a plurality of tabs being formed on an inner surface of the side wall;
  a cover mounted on the chassis, the cover having a stop formed on an inner surface of the cover; and
  a locking member retained on the inner surface of the side wall of the chassis by the plurality of tabs, the locking member having at least one resilient hook extending through the opening in the side wall of the chassis and engaging with the stop of the cover;
  whereby when the hook of the locking member is deformed into the opening of the chassis, the cover is ready to be removed wherein a pressing member for deforming the hook of the locking member is attached to the cover, and the pressing member is accessible outside.

15. The computer enclosure as described in claim 14, wherein a resilient member is compressed between the chassis and the cover for forcing the cover to move away from the chassis.

16. The computer enclosure as described in claim 15, wherein the chassis defines a recess at a front corner thereof for receiving the resilient member.

17. The computer enclosure as described in claim 16, wherein one end of the resilient member is secured on the cover, and the other end of the resilient member is compressed against a wall of the recess.

18. The computer enclosure as described in claim 14, wherein the locking member has a plurality of clips and strips for the tabs of the chassis catching on.

* * * * *